3,459,009
LATCH NEEDLE FOR KNITTING MACHINES
Wolfgang Wiederhut and Rudolf Ströhlein, Ebingen, Germany, assignors to Theodor Groz & Sohne & Ernst Beckert Nadelfabrik Commandit-Gesellschaft, Ebingen, Germany, a corporation of Germany
Filed Apr. 21, 1967, Ser. No. 632,770
Claims priority, application Germany, June 21, 1966, G 47,220; Jan. 5, 1967, G 48,935
Int. Cl. D04b 35/04, 35/06; B21g 1/06
U.S. Cl. 66—122         1 Claim

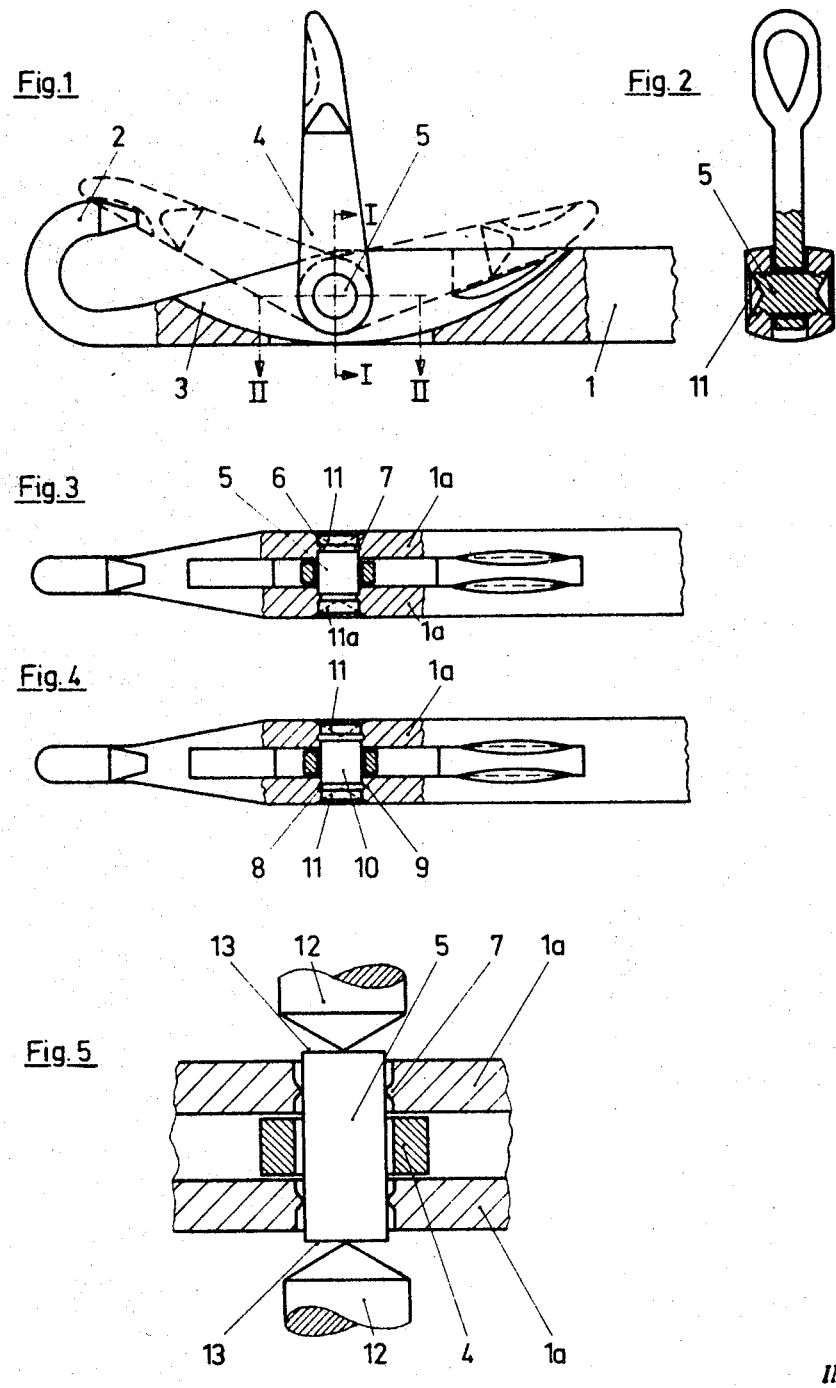

ABSTRACT OF THE DISCLOSURE

A latch needle having a smooth countersunk pivot pin, and shaft sides connected with the pivot pin by means of a mutually engaging annular groove and annular bead, wherein two flat end faces of the pivot pin are upset by means of press tools having conical ends.

---

The invention concerns a latch needle for knitting machines having a smooth, counter-sunk pivot pin for the latch, and shaft sides with an annular groove and annular bead connection with the pivot pin.

In a known embodiment of this kind the two end faces of the pivot pin are upset by pressure between two press tools in order, by means of the pin metal cold flow, to secure the pin firmly in the needle. This causes the pivot pin to be enlarged in the region of the latch, which may be taken into account by suitatbly dimensioning the latch bore, so as not to impair the free movement of the latch.

The object of the invention is to eliminate this pin thickening action or at least to reduce its extent and improve the needle. The invention is characterized by the feature that the two flat end faces of the pivot pin are upset by conical or tapered press tools.

The conical points of the press tools acting on the flat end faces of the pin during upsetting produce little or no enlargement of the center diameter of the pin in the region engaged by the latch. The main metal flow in the pivot pin during upsetting takes place at the parts of the pivot pin opposite the shaft sides. Here the metal distortion causes a positive connection between sides and pin which is required in view of the stresses acting on the needle during knitting. When dimensioning the latch bore, no noticeable account has to be taken of pin diameter enlargement, which is a further advantage. Moreover the metal displacement obtainable by upsetting with conical press tools fully establishes the required positive connection between pivot pin and shaft sides. The result is a needle the pivot pin of which is anchored in a better manner than has hitherto been possible, the latch having a satisfactory, firm pivot. These advantages are all the more significant the thinner the needles, since in this case not only the shaft sides but also the latches are thinner, amounting to e.g. only 1/10 mm. each with needles 3/10 mm. thickness. The thinner the shaft sides of the needles and the latch, the shorter also becomes the pivot pin, so that the mutual difficulties increase. The invention permits all these difficulties to be reduced.

The conically counter-sunk impressions at the end faces of the pivot pin of the latch needle in accordance with the invention has no interfering burred edge, since it is recessed relative to the outer wall surfaces of the shaft sides.

In a further development of the invention it is proposed that between three or more generating lines located on the conical surface of the press tool, has three or more flat or fluted faces radiating from the center. In this form of invention, positive connection between the pivot pin and the shaft sides is mainly at three or more lines between the faces on the conical surface of the press tool, while in the flat face region the positive connection is weaker or is not established. Hence tendency to enlargement of the pivot pin in the region of the latch is further reduced. The danger of the pin deformation spreading to the shaft sides is also reduced, this spreading being most likely with specially thin needle shafts. Although positive connection no longer extends evenly throughout the annular groove or the annular bead, the pivot pin is still adequately prevented from rotation.

Some examples of the invention are illustrated in the accompanying drawings, in which:

FIGS. 1 to 3 show an embodiment in side view, cross-section and plan view, partly in section, respectively.

FIG. 4 is an alternative embodiment in plan view, partly in section,

FIG. 5 shows the upsetting on an enlarged scale,

Figure 6:
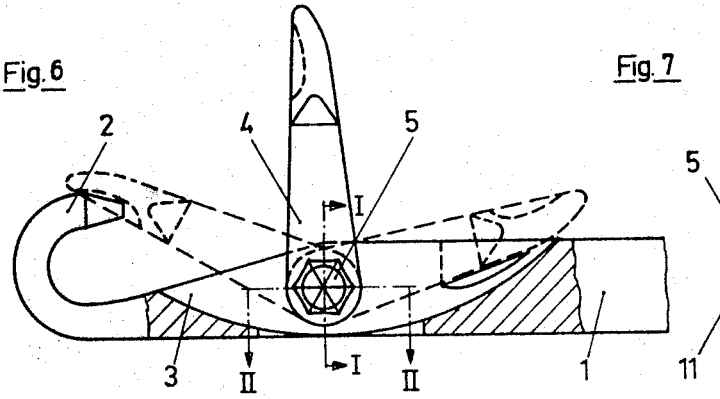
FIGS. 6 to 8 show an alternative embodiment in side view, cross-section and plan view, partly in section, respectively.

FIG. 1 of a latch needle shows the shaft 1 with one end bent into a hook 2. A latch 4 mounted so as to be pivotal on a pivot pin 5 in a slot 3 of the shaft, co-operates with the hook 2. The pivot pin 5 has a smooth surface in the region of the latch, and a recess in the form of an annular groove 6 in the region of both shaft sides 1a in which groove projections in the form of annular beads 7 of the shaft sides engage. The end faces of the pivot pin 5 are countersunk in the shaft holes. In the example of FIG. 4 the pivot pin 10 has an annular bead 8 on each end which engages with a corresponding recess in the form of an annular groove 9 in the respective shaft side.

The flat end faces 13 of the pivot pin 5 are upset as indicated in FIG. 5 to the form shown in FIGS. 1 to 3 by means of conical press tools 12, the conical impression 11 of which remains visible on the end faces of the pivot pin. The cone angle may vary between 90° and 150°.

Figure 7:
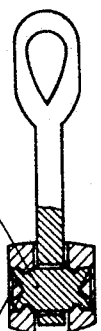
Figure 8:
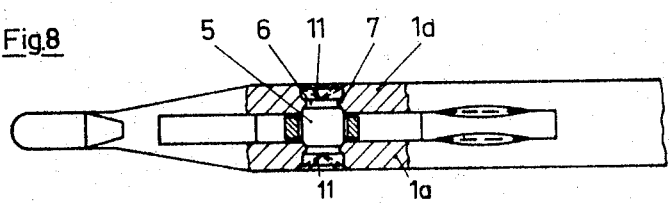
Figure 9:
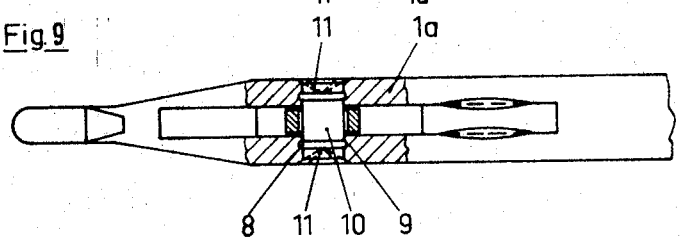
FIG. 9 is an alternative embodiment partly in sectional plan view.
Figure 10:
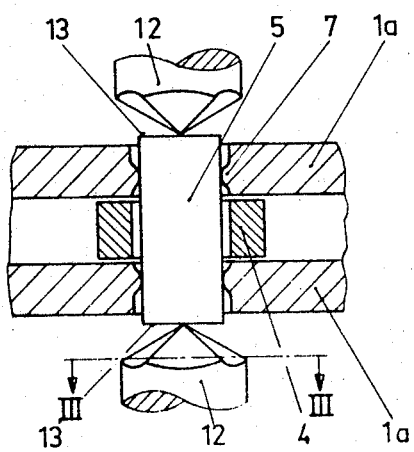
FIG. 10 shows the upsetting means of FIG. 6 on an enlarged scale.
Figure 11:
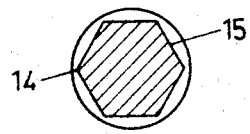
FIGS. 11 and 12 show two further press tool shapes in section taken on the plane III—III of FIG. 10.
Figure 12:
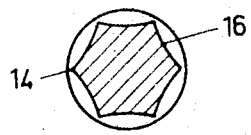

The flat end faces 13 of the pivot pin 5 of a needle in accordance with FIGS. 6 to 8 are upset by means of press tool 12 as indicated in FIGURES 11–12, the edge lines 14 of the tool faces being located on a cone, with flat faces 15 as shown in FIG. 11 or concave faces 16 as shown in FIG. 12. The tool impression 11 at the pivot pin end faces remain visible. The positive connection between groove and bead obtainable thereby is of annular form.

The invention may also be applied with its inherent advantages if the annular groove or annular bead form part of a thread, more especially a complete turn.

We claim:
1. A latch needle for a knitting machine comprising:
 (a) a shaft portion, a hook and a latch portion,
 (b) said shaft portion having two shaft sides along a longitudinal opening adjacent said hook to accommodate one end of said latch portion between said two shaft sides,

(c) each said shaft side including a first engaging surface around openings which are in axial alignment with an opening in said hook,
(d) a pivot pin having a second engaging surface which is located adjacent each said first engaging surface and a central portion located within said latch opening,
(e) an annular groove located on one of said engaging surfaces and an annular bead located on the other said engaging surfaces,
(f) said annular groove and annular bead being mutually engaged within each said shaft side opening,
(g) said pivot pin having a conical shaped pointed depression at each end thereof, the material of said pivot pin having a heterogeneous structure including expanded work hardened end portions within each said shaft side opening and a central portion in a substantially upset free condition within said latch opening.

References Cited

UNITED STATES PATENTS

| | | | |
|---|---|---|---|
| 427,134 | 5/1890 | Treat | 66—122 |
| 743,152 | 11/1903 | Currier | 66—122 |
| 2,767,566 | 10/1956 | Parsons | 66—122 |

FOREIGN PATENTS

| | | |
|---|---|---|
| 14,407 | 7/1881 | Germany. |
| 458,377 | 7/1950 | Italy. |

OTHER REFERENCES 1,159,585, December 1963, German printed application, Weiderhut et al., 66 122 1 2.

ROBERT R. MACKEY, Primary Examiner

U.S. Cl. X.R.

163—3, 5